（12) United States Patent
Nakai et al.

(10) Patent No.: US 10,073,262 B2
(45) Date of Patent: Sep. 11, 2018

(54) INFORMATION DISTRIBUTION SYSTEM, HEAD MOUNTED DISPLAY, METHOD FOR CONTROLLING HEAD MOUNTED DISPLAY, AND COMPUTER PROGRAM

(71) Applicant: SEIKO EPSON CORPORATION, Tokyo (JP)

(72) Inventors: Satoshi Nakai, Matsumoto (JP); Yuichi Mori, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 63 days.

(21) Appl. No.: 14/723,145

(22) Filed: May 27, 2015

(65) Prior Publication Data

US 2015/0363974 A1 Dec. 17, 2015

(30) Foreign Application Priority Data

Jun. 16, 2014 (JP) ................................. 2014-123057

(51) Int. Cl.
*G06T 15/00* (2011.01)
*G02B 27/01* (2006.01)
(Continued)

(52) U.S. Cl.
CPC ....... *G02B 27/017* (2013.01); *G06K 9/00671* (2013.01); *G06K 9/00697* (2013.01);
(Continued)

(58) Field of Classification Search
None
See application file for complete search history.

(56) References Cited

U.S. PATENT DOCUMENTS 8,810,599 B1 * 8/2014 Tseng .................... G06T 7/0018
340/435
9,390,561 B2 * 7/2016 Brown .................. G06T 19/006
(Continued)

FOREIGN PATENT DOCUMENTS

JP 2006-091390 A 4/2006
JP 2010273031 A 12/2010
(Continued)

*Primary Examiner* — Andrew G Yang
(74) *Attorney, Agent, or Firm* — Oliff PLC

(57) ABSTRACT

An information distribution system includes an image display apparatus including a position identification section that identifies the position of the image display apparatus, a first communication section, and a control section; and an information processing apparatus including a storage section that stores content information, a second communication section, and a selection section. The selection section selects at least two contents from a plurality of contents stored in the storage section based on the received position of the image display apparatus. The second communication section distributes content information on the selected at least two contents to the first communication section. The control section sets one content in the received content information as a first content and causes the image display section to display the set first content and the contents other than the first content in the distributed content information in different display forms.

15 Claims, 11 Drawing Sheets

(51) Int. Cl.
*G06K 9/00* (2006.01)
*H04N 13/344* (2018.01)
*G06K 9/22* (2006.01)
*H04N 13/366* (2018.01)
*G06F 3/147* (2006.01)

(52) U.S. Cl.
CPC .............. *G06K 9/22* (2013.01); *H04N 13/344* (2018.05); *G02B 2027/014* (2013.01); *G02B 2027/0132* (2013.01); *G02B 2027/0138* (2013.01); *G02B 2027/0178* (2013.01); *G06F 3/147* (2013.01); *H04N 13/366* (2018.05); *H04N 2213/008* (2013.01)

(56) References Cited

U.S. PATENT DOCUMENTS

| | | | | |
|---|---|---|---|---|
| 2010/0149399 | A1* | 6/2010 | Mukai | G01C 21/20 348/333.02 |
| 2010/0208033 | A1* | 8/2010 | Edge | G06F 3/012 348/46 |
| 2011/0158478 | A1* | 6/2011 | Yamada | G02B 6/0006 382/103 |
| 2012/0019558 | A1* | 1/2012 | Jung | H04W 4/04 345/633 |
| 2013/0328927 | A1* | 12/2013 | Mount | G06T 19/006 345/633 |
| 2014/0132484 | A1* | 5/2014 | Pandey | G02B 27/0172 345/8 |
| 2014/0225918 | A1* | 8/2014 | Mittal | G06F 3/017 345/633 |
| 2014/0244160 | A1* | 8/2014 | Cragun | G01C 21/20 701/436 |
| 2014/0292653 | A1 | 10/2014 | Kamba et al. | |
| 2014/0362111 | A1* | 12/2014 | Kim | G06T 19/006 345/633 |
| 2015/0052479 | A1 | 2/2015 | Ooi et al. | |

FOREIGN PATENT DOCUMENTS

| | | |
|---|---|---|
| JP | 2013012024 A | 1/2013 |
| JP | 2013-054661 A | 3/2013 |
| JP | 2013115644 A | 6/2013 |
| JP | 2013-218597 A | 10/2013 |

\* cited by examiner

| CURRENT POSITION | SIGHTSEEING SPOT |
|---|---|
| REGION A1 | 1. A1 TOWER, 2. PUBLIC PARK, 3. · · · |
| REGION B1 | 1. B1 TEMPLE, 2. B1 GORGE, 3. · · · |
| REGION C1 | 1. C1 GARDEN, 2. PUBLIC LIBRARY, 3. · · · |
| REGION D1 | 1. D1 MALL |
| ⋮ | |

INFORMATION DISTRIBUTION SYSTEM, HEAD MOUNTED DISPLAY, METHOD FOR CONTROLLING HEAD MOUNTED DISPLAY, AND COMPUTER PROGRAM

BACKGROUND

1. Technical Field

The present invention relates to an information distribution system.

2. Related Art

There is a known information distribution system that distributes contents on eating and drinking places, sightseeing spots, and other places from a server to a mobile phone, a PDA (personal digital assistant), and other mobile electronic devices. One of the mobile electronic devices is a head mounted display (HMD), which is a display mounted on the user's head. A head mounted display, for example, produces image light representing an image based on a content by using a liquid crystal display and a light source and guides the produced image light to the user's eyes by using a projection system and a light guide plate to allow the user to view a virtual image. A head mounted display is classified into two types: a transmissive type that allows the user to view an outside scene as well as a virtual image; and a non-transmissive type that does not allow the user to view an outside scene. The transmissive head mounted display is further classified into an optically transmissive type and a video transmissive type.

JP-A-2013-12024 discloses an information processing system including an HMD that displays an image of a content identified based on information on the position of a user who wears the HMD and azimuth information representing the orientation of the user's head. JP-A-2010-273031 discloses an HMD that communicates with a communication terminal present in front of a user who wears the HMD based on the orientation of the user. JP-A-2013-115644 discloses a technology for allowing a plurality of users to view different respective images displayed on a single image display apparatus and changing the display positions of the images displayed on the image display apparatus in accordance with a change in the position of each of the users.

In the technology described in JP-A-2013-12024, however, since a content is displayed based on the information on the position of the user who wears the HMD and the orientation of the user, a content unnecessary for the user is undesirably displayed in some cases. In the technology described in JP-A-2010-273031, no communication can be established with a communication terminal that is present in a position other than positions in front of the user who wears the HMD, and a content that the user desires to view cannot be displayed on the HMD in some cases. In the technology described in JP-A-2013-115644, since the display position of an image displayed on the image display apparatus is changed in accordance with a change in the position of each of the users, even an image of a content unnecessary for the user is undesirably moved to a position in front of the user in some cases.

SUMMARY

An advantage of some aspects of the invention is to solve at least apart of the problems described above, and the invention can be implemented as the following aspects.

(1) An aspect of the invention provides an information distribution system. The information distribution system includes: an image display apparatus including an image display section that displays an image based on a content, a position identification section that identifies the position of the image display apparatus, a first communication section, and a control section; and an information processing apparatus including a storage section that stores content information on a content related to a position, a second communication section, and a selection section. The first communication section transmits information on the identified position of the image display apparatus to the second communication section. The second communication section receives the transmitted information on the position of the image display apparatus. The selection section selects at least two contents from a plurality of contents stored in the storage section based on the received position of the image display apparatus. The second communication section distributes content information on the selected at least two contents to the first communication section. The first communication section receives the distributed content information. The control section sets one content in the received content information as a first content and causes the image display section to display the set first content and the contents other than the first content in the distributed content information in different display forms. According to the information distribution system in the aspect, the display form of an image of a content displayed on the image display section is changed in accordance with the position of the image display apparatus and whether or not the content is the first content. As a result, the first content that a user of the image display apparatus desires to view can be displayed on the image display section more preferentially and in more detail than the other contents, whereby the convenience of the user is improved.

(2) In the information distribution system according to the aspect described above, the image display section may display a virtual image as the image displayed based on a content and may transmit an outside scene. According to the information distribution system of this aspect, the user can view the image displayed on the image display section and the outside scene that the image display section transmits, whereby the convenience of the user is improved.

(3) In the information distribution system according to the aspect described above, the image display apparatus may further include an orientation identification section that identifies the orientation of the image display section, and the control section may set, based on the identified position of the image display apparatus, the distributed content information, and the identified orientation of the image display section, a display form of a first virtual image that is a virtual image displayed based on the first content and a display form of a second virtual image that is a virtual image displayed based on the contents other than the first content. According to the information distribution system of this aspect, the first content that the user conceivably desires to view is displayed in detail and the other contents are displayed with a minimum amount of information. The user can thus view detailed information on the first content while viewing the transmitted outside scene over a wide range, whereby the convenience of the user is further improved.

(4) In the information distribution system according to the aspect described above, the control section may store a change in the identified orientation of the image display section and set at least one of the display form of the first virtual image and the display form of the second virtual image based on the identified position of the image display apparatus, the distributed content information, and the stored change in the orientation of the image display section.

According to the information distribution system of this aspect, the control section sets the display form of an image displayed on the image display section based on the orientation of the image display section and in consideration of the stored changes in the orientation of the image display section, whereby a content that the user desired to view can be more appropriately provided.

(5) In the information distribution system according to the aspect described above, the control section may set, based on the identified position of the image display apparatus, the distributed content information, and a captured outside scene, at least one of a display form of a first virtual image that is a virtual image displayed based on the first content and a display form of a second virtual image that is a virtual image displayed based on the contents other than the first content. According to the information distribution system of this aspect, since the user can visually recognize which content in a captured image is displayed in the form of information on a displayed image, the user readily recognize the correspondence relationship between the image of the content and an image related to the content contained in the outside scene, whereby the convenience of the user is further improved.

(6) In the information distribution system according to the aspect described above, the image display apparatus may further include an imaging section that captures an image of the outside scene. According to the information distribution system of this aspect, since the user can visually recognize which content in a captured image captured in real time is displayed in the form of information, the convenience of the user is further improved.

(7) In the information distribution system according to the aspect described above, the control section may detect an image related to the first content in the captured outside scene and, as the display form of the first virtual image, set the position where the first virtual image is displayed on the image display section to be a position related to the detected image. According to the information distribution system of this aspect, since the user can visually recognize which content in a captured image is displayed in the form of information on a displayed image, the user readily recognize the correspondence relationship between the image of the content and an image related to the content contained in the outside scene, whereby the convenience of the user is further improved.

(8) In the information distribution system according to the aspect described above, the image display apparatus may further include a distance measurement section that measures the distance between a position related to a content in the distributed content information and the position of the image display apparatus, and the control section may set at least one of the display form of the first virtual image and the display form of the second virtual image based on a measured distance to at least one content, the identified position of the image display apparatus, and the distributed content information. According to the information distribution system of this aspect, in a case where a content is related to a specific position, the user can recognize the distance to the position related to the content even when the user cannot view the content as an outside scene, whereby the convenience of the user is further improved.

(9) In the information distribution system according to the aspect described above, the image display apparatus may further include an operation section that accepts operation. The control section may produce content specifying information that specifies a content in the distributed content information based on the accepted operation. The first communication section may transmit the produced content specifying information to the second communication section. The second communication section may receive the transmitted content specifying information. The selection section may select at least two contents from the content information stored in the storage section based on the received content specifying information and the identified position of the image display apparatus. According to the information distribution system of this aspect, since among the contents in the content information stored in the storage section, at least two contents within a range narrowed based on the content specifying information are transmitted to the image display apparatus, an image of a content that the user desired to view can be more appropriately displayed on the image display section, whereby the convenience of the user is further improved.

(10) In the information distribution system according to the aspect described above, at least one of the display form of the first virtual image and the display form of the second virtual image may be the position where a virtual image is displayed on the image display section. According to the information distribution system of this aspect, images of contents are displayed on the image display section with the display position of the first content being different from the display positions of the other contents, the user can more readily recognize the contents as visual information.

(11) In the information distribution system according to the aspect described above, the image display section may display a virtual image as the image displayed based on a content and transmits an outside scene. The image display apparatus may further include an orientation identification section that identifies the orientation of the image display section. The first communication section may transmit orientation information representing the identified orientation to the second communication section. The second communication section may receive the transmitted orientation information. The selection section may select the at least two contents based on the identified position of the image display apparatus and the transmitted orientation information. According to the information distribution system of this aspect, the user can view detailed information on the first content while viewing the transmitted outside scene over a wide range, and the processing burden on the image display apparatus can be reduced.

(12) Another aspect of the invention provides a transmissive head mounted display. The head mounted display includes a position identification section that identifies the position of the head mounted display, a first receiver that receives distributed content information in relation to the identified position, an image display section that displays virtual images based on at least two contents in the received content information and transmits an outside scene, and a control section that sets one content in the received content information as a first content and causes the image display section to display the set first content and the contents other than the first content in the distributed content information in different display forms. According to the head mounted display in the aspect, the display form of an image of a content displayed on the image display section is changed in accordance with the position of the image display apparatus and whether or not the content is the first content. As a result, the first content that a user of the image display apparatus desires to view can be displayed on the image display section more preferentially and in more detail than the other contents, whereby the convenience of the user is improved.

(13) Still another aspect of the invention provides a transmissive head mounted display. The head mounted display includes a position identification section that identifies the position of the head mounted display, a storage section that stores contents, a selection section that selects at least two contents based on the identified position, an image display section that displays virtual images based on the selected at least two contents and transmits an outside scene, and a control section that sets one of the selected at least two contents as a first content and causes the image display section to display the set first content and the contents other than the first content in the stored content information in different display forms. According to the head mounted display in the aspect, the first content that a user desires to view can be displayed on the image display section more preferentially and in more detail than the other contents, whereby the convenience of the user is improved.

All the plurality of components in the aspects of the invention described above are not essential, and part of the plurality of components can be changed, omitted, replaced with new other components as appropriate, and part of the limiting conditions can be omitted as appropriate in order to achieve part or entirety of the advantageous effects described in the present specification. Further, to achieve part or entirety of the advantageous effects described in the present specification, part or entirety of the technical features contained in any one of the aspects of the invention described above can be combined with part or entirety of the technical features contained in another one of the aspects of the invention described above to form an independent aspect of the invention.

For example, an aspect of the invention can be implemented as a system including one or both of the following two elements: an image display apparatus; and an information processing apparatus. That is, the system may or may not include the image display apparatus. Further, the system may or may not include the information processing apparatus. The image display apparatus may, for example, be an image display apparatus including an image display section that displays an image based on a content and may include a position identification section that identifies the position of the image display apparatus, a first communication section, and the control section. The information processing apparatus may, for example, include a storage section that stores content information on a content related to a position, a selection section that selects at least two contents from a plurality of contents stored in the storage section based on the identified position of the image display apparatus, and a second communication section that distributes content information on the selected at least two contents to the first communication section. The first communication section may, for example, receive the distributed content information. The control section may, for example, set one content in the received content information as a first content and cause the image display section to display the set first content and the contents other than the first content in the distributed content information in different display forms. The thus configured system can, for example, be achieved in the form of an information distribution system and also in the form of another system other than an information distribution system. According to the aspect described above, at least one of the variety of following results can be achieved: improvement in operability of the system and simplification of the system; integration of the system; and improvement in convenience of the user who uses the system. Part or entirety of the technical features of the aspects of the information distribution system described above is applicable to the system described in this section.

The invention can be implemented in a variety of other aspects in addition to an information distribution system. For example, the invention can be implemented in the following aspects: an image display apparatus; a method for controlling a head mounted display and the image display apparatus; a system for controlling information distribution, a head mounted display system; a computer program for implementing the functions of the system for controlling information distribution and the image display apparatus; a recording medium on which the computer program is recorded; and a data signal containing the computer program and embodied in a carrier wave.

BRIEF DESCRIPTION OF THE DRAWINGS

The invention will be described with reference to the accompanying drawings, wherein like numbers reference like elements.

FIG. 7 is a bird's eye view showing the positional relationship between a user of the HMD and sightseeing spot having been searched for.

DESCRIPTION OF EXEMPLARY EMBODIMENTS

Figure 1:
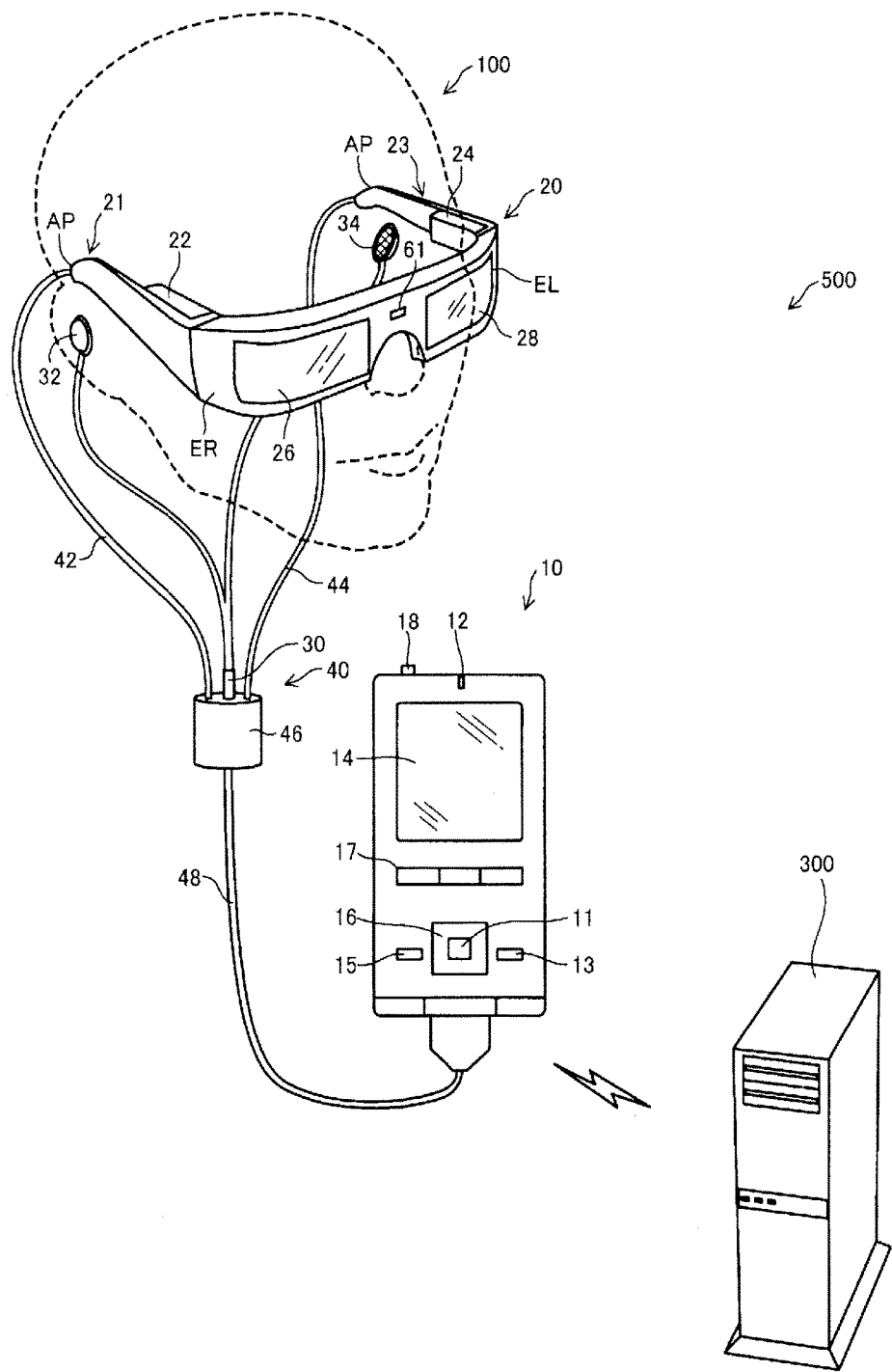
FIG. 1 is a descriptive diagram showing a schematic configuration of an information distribution system in an embodiment of the invention.

A. Embodiment
A-1. Configuration of Information Distribution System:

FIG. 1 is a descriptive diagram showing a schematic configuration of an information distribution system 500 in an embodiment of the invention. The information distribution system 500 includes a head mounted display 100 (HMD 100), which is mounted on the user's head and allows the user to view a virtual image, and a server 300, which distributes a plurality of contents set on a region basis to the HMD 100 or any other information terminal. The information distribution system 500 is provided with only one HMD 100 and only one server 300, but at least one of the HMD 100 and server 300 may be replaced with a plurality of HMDs 100 or servers 300.

Figures 2, 3:
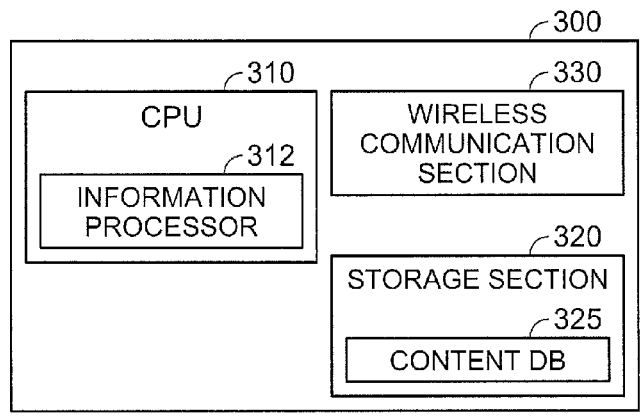
FIG. 2 is a block diagram showing the configuration of a server on a function basis.
FIG. 3 schematically shows an example of contents stored in a content DB in the server.

FIG. 2 is a block diagram showing the configuration of the server 300 on a function basis. The server 300 includes a storage section 320, which stores a plurality of contents to be distributed to the HMD 100, a wireless communication section 330, which performs wireless communication for distribution of the plurality of contents to the HMD 100, and a CPU 310. The storage section 320 is formed of a ROM, a RAM, and other devices. The storage section 320 has a content database 325 (content DB 325), which stores content information that identifies the plurality of contents related to regions. When a content is an object viewed by the user, such as a building, the content DB325 further stores image data on the content. The storage section 320 further stores a variety of computer programs.

The wireless communication section 330 performs wireless communication with other apparatus in accordance with a predetermined wireless communication scheme, such as a wireless LAN and Bluetooth (registered trademark). The wireless communication section 330 allows the server 300 and the HMD 100 to transmit and receive a variety of types of information to and from each other. The CPU 310 reads and executes the computer programs stored in the storage section 320. The CPU 300 includes an information processor 312, which selects a plurality of contents from the content information stored in the content DB 325 based on information on the position, the orientation, and other factors of the an image display section 20 of the HMD 100 received via the wireless communication section 330. A method for identifying the position, the orientation, and other factors of the image display section 20 will be described later. The information processor 312 transmits the selected plurality of contents to the HMD 100 via the wireless communication section 330. In the following description, the plurality of contents selected by the information processor 312 are also called selected contents. The server 300 in the present embodiment corresponds to the information processing apparatus in the appended claims. The wireless communication section 330 in the server 300 corresponds to the second communication section in the appended claims. The information processor 312 in the server 300 corresponds to the selection section in the appended claims.

FIG. 3 schematically shows an example of the contents stored in the content DB 325 in the server 300. FIG. 3 shows, as an example of the contents stored in the content DB 325, data 327 on sightseeing spots related to the current position of the image display section 20 of the HMD 100. The sightseeing spot data 327 stores popular sightseeing spots in relation to a plurality of divided regions in descending order of popularity in each of the regions. For example, the most popular sightseeing spot related to a region A1 is an A1 tower, and the second most popular sightseeing spot related to the region A1 is a public park. FIG. 3 shows part of the sightseeing spots related to regions A1, B1, C1, and D1 and does not show, for example, the third most popular sightseeing spot related to the region A1.

The HMD100 shown in FIG. 1 is an optically transmissive head mounted display that allows the user to not only view a virtual image but also directly view an outside scene at the same time. In the present specification, a virtual image that the HMD 100 allows the user to view is also called a "displayed image" for convenience. Further, outputting image light produced based on a content or any other image data is also called "displaying an image."

The HMD 100 includes the image display section 20, which is mounted on the user's head and allows the user to view a virtual image, and a control section 10 (controller 10), which controls the image display section 20.

The image display section 20 is a mountable body mounted on the user's head and has a glasses-like shape in the present embodiment. The image display section 20 includes a right holder 21, a right display driver 22, a left holder 23, a left display driver 24, a right optical image display section 26, a left optical image display section 28, and a camera 61. The right optical image display section 26 and the left optical image display section 28 are so disposed that they are positioned in front of the right and left eyes of the user who wears the image display section 20. One end of the right optical image display section 26 and one end of the left optical image display section 28 are connected to each other in a position corresponding to the middle of the forehead of the user who wears the image display section 20.

The right holder 21 is a member that extends from an end ER of the right optical image display section 26, which is the other end thereof, to a position corresponding to the right temporal region of the user who wears the image display section 20. Similarly, the left holder 23 is a member that extends from an end EL of the left optical image display section 28, which is the other end thereof, to a position corresponding to the left temporal region of the user who wears the image display section 20. The right holder 21 and the left holder 23 serve as the temples (bows) of glasses and hold the image display section 20 around the user's head.

The right display driver 22 and the left display driver 24 are disposed on opposite sides of the head of the user who wears the image display section 20. In the following description, the right holder 21 and the left holder 23 are also simply collectively called a "holder," the right display driver 22 and the left display driver 24 are also simply collectively called a "display driver," and the right optical image display section 26 and the left optical image display section 28 are also simply collectively called an "optical image display section."

The display drivers 22, 24 includes liquid crystal displays 241 and 242 (hereinafter also called "LCDs 241 and 242"), projection systems 251 and 252, and other components (see FIG. 4). The configuration of each of the display drivers 22 and 24 will be described later in detail. The optical image display section 26 and 28, each of which serves as an optical member, include light guide plates 261 and 262 (see FIG. 4) and light control plates. The light guide plates 261 and 262 are made, for example, of a light transmissive resin material and guide image light outputted from the display drivers 22 and 24 to the user's eyes. The light control plates are each a thin-plate-shaped optical element and so disposed that they cover the front side of the image display section 20 that faces away from the side where the user's eyes are present. The light control plates protect the light guide plates 261 and 262 and prevent damage to the light guide plates 261 and 262, adhesion of dirt thereto, and other disadvantageous effects. Further, adjustment of the light transmittance of the light control plates allows adjustment of the amount of external light incident on the user's eyes for adjustment of visibility of a virtual image. The light control plates can be omitted.

The camera 61 is disposed in a position corresponding to the middle of the forehead of the user who wears the image display section 20. The thus disposed camera 61 captures an image of an outside scene viewed in the direction of the line of sight of the user who wears the image display section 20 to acquire a captured image. The camera 61 is a monocular camera and may instead be a stereoscopic camera. The camera 61 corresponds to the imaging section in the appended claims.

The image display section 20 further includes a connection section 40 for connecting the image display section 20 to a control section 10. The connection section 40 includes a main cord 48, which is connected to the control section 10, a right cord 42, a left cord 44, and a connection member 46. The right cord 42 and the left cord 44 are two cords into which the main cord 48 bifurcates. The right cord 42 is inserted into an enclosure of the right holder 21 through a lengthwise end portion AP of the right holder 21 and connected to the right display driver 22. Similarly, the left cord 44 is inserted into an enclosure of the left holder 23 through a lengthwise end portion AP of the left holder 23 and connected to the left display driver 24. The connection member 46 is disposed at the point where the main cord 48 bifurcates into the right cord 42 and the left cord 44 and has a jack for connecting an earphone plug 30. A right earphone 32 and a left earphone 34 extend from the earphone plug 30.

The image display section 20 and the control section transmit a variety of signals to each other via the connection section 40. A connector (not shown) is provided not only at the end of the main cord 48 that faces away from the side where the connection member 46 is present but also at the control section 10, and the connectors engage with each other. Causing the connector at the main cord 48 and the connector at the control section 10 to engage with each other and disengage from each other allows the control section 10 and the image display section 20 to be connected to each other and disconnected from each other. Each of the right cord 42, the left cord 44, and the main cord 48 can, for example, be a metal cable or an optical fiber.

The control section 10 is an apparatus for controlling the HMD 100. The control section 10 includes a finalizing key 11, a lighting portion 12, a display switch key 13, a track pad 14, a luminance switch key 15, a direction key 16, a menu key 17, and a power switch 18. The finalizing key 11 detects user's pressing operation and outputs a signal that finalizes the operation performed through the control section 10. The lighting portion 12 notifies the user of the action state of the HMD 100 in the form of the lighting state. An example of the action state of the HMD 100 is whether it is powered on or off. The lighting portion 12 is formed, for example, of an LED. The display switch key 13 detects user's pressing operation and outputs a signal that switches, for example, content motion image display mode between a 3D mode and a 2D mode. The track pad 14 detects operation performed by a user's finger on an operation surface of the track pad 14 and outputs a signal according to a result of the detection. Examples of the track pad 14 may include a variety of types of track pad, such as an electrostatic type, a pressure detection type, and an optical type. The luminance switch key 15 detects user's pressing operation and outputs a signal that increases or decreases the luminance of an image displayed by the image display section 20. The direction key 16 detects user's pressing operation performed on an upward, downward, rightward, or leftward portion of the key and outputs a signal according to a result of the detection. The power switch 18 detects user's operation of sliding the switch and powers on or off the HMD 100.

Figure 4:
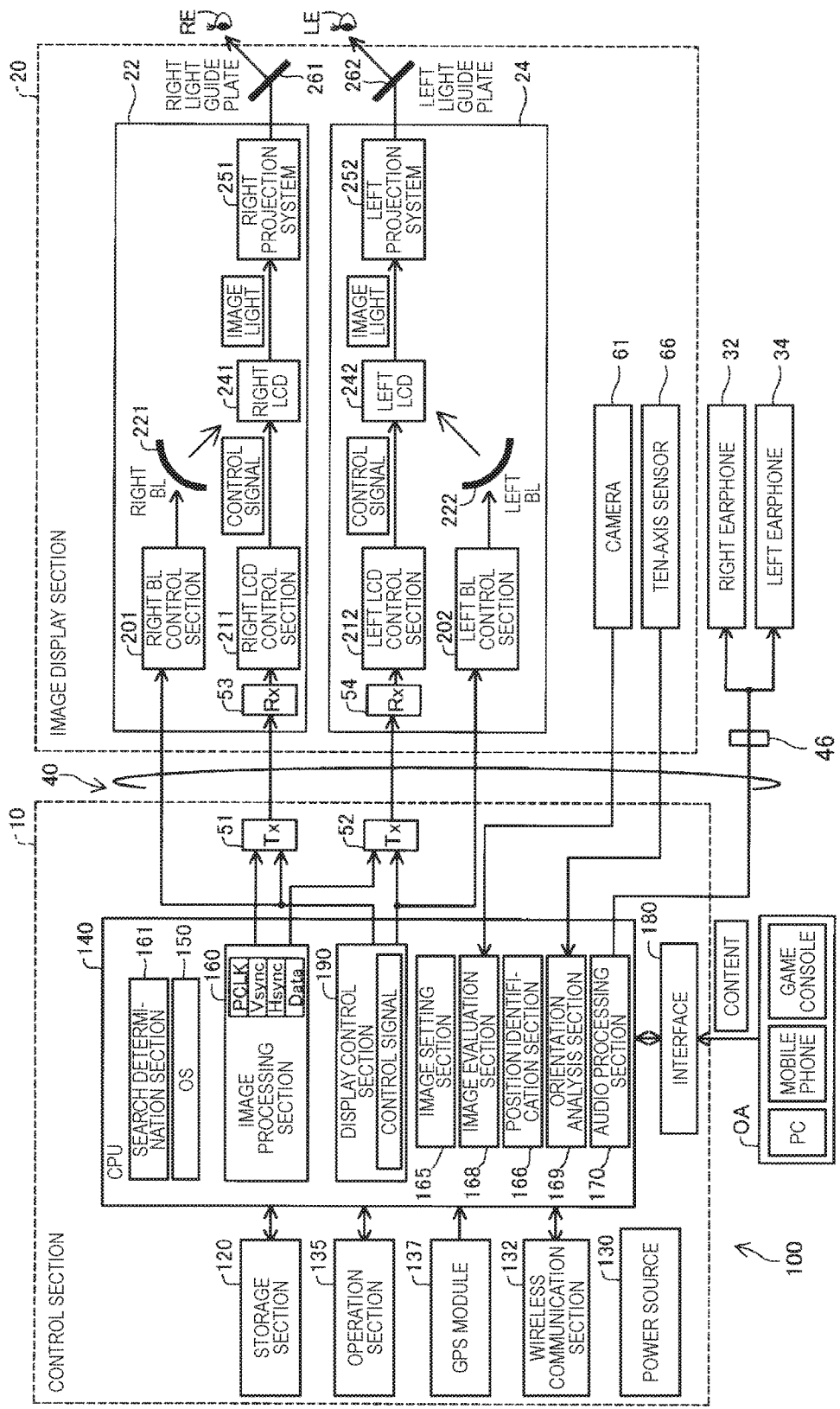
FIG. 4 is a block diagram showing the configuration of an HMD on a function basis.

FIG. 4 is a block diagram showing the configuration of the HMD 100 on a function basis. The control section 10 includes a storage section 120, a power source 130, a GPS module 137, a wireless communication section 132, an operation section 135, a CPU 140, an interface 180, a transmitter 51 (Tx 51), and a transmitter 52 (Tx 52), as shown in FIG. 4. The operation section 135 accepts user's operation and is formed of the finalizing key 11, the display switch key 13, the track pad 14, the luminance switch key 15, the direction key 16, the menu key 17, and the power switch 18.

The power source 130 supplies the components in the HMD 100 with electric power. The power source 130 can, for example, be a secondary battery. The storage section 120 stores a variety of computer programs. The storage section 120 is formed of a ROM, a RAM, and other devices.

The GPS module 137 receives signals from GPS satellites to identify the current position of the image display section 20 and produces positional information representing the position. Identification of the current position of the image display section 20 allows identification of the current position of the user who wears the HMD 100.

The wireless communication section 132 performs wireless communication with other apparatus in accordance with a predetermined wireless communication scheme, such as a wireless LAN and Bluetooth (registered trademark). The wireless communication section 132 receives the selected contents transmitted via the wireless communication section 330 in the server 300. The wireless communication section 132 corresponds to the first communication section in the appended claims.

The CPU 140, which reads and executes the computer programs stored in the storage section 120, functions as an operating system 150 (OS 150), a display control section 190, an audio processing section 170, an image processing section 160, an orientation analysis section 169, an image evaluation section 168, a position identification section 166, a search determination section 161, and an image setting section 165.

The display control section 190 produces control signals that control the right display driver 22 and the left display driver 24. Specifically, the display control section 190 separately controls, with the aid of the control signals, for example, whether or not a right LCD control section 211 drives the right LCD 241, whether or not a right backlight control section 201 drives a right backlight 221, whether or not a left LCD control section 212 drives the left LCD 242, and whether or not a left backlight control section 202 drives a left backlight 222. The display control section 190 thus causes each of the right display driver 22 and the left display driver 24 to generate and output image light. For example, the display control section 190 causes both the right display driver 22 and the left display driver 24 to generate image light, only one of them to generate image light, or neither of them to generate image light.

The display control section 190 transmits control signals that control the right LCD control section 211 and the left LCD control section 212 via the transmitters 51 and 52. The display control section 190 further transmits control signals that control the right backlight control section 201 and the left backlight control section 202.

The image processing section 160 acquires an image signal contained in a content. The image processing section 160 separates a vertical sync signal VSync, a horizontal sync signal HSync, and other sync signals from the acquired image signal. Further, the image processing section 160 produces a clock signal POLK, for example, by using a PLL (phase locked loop) circuit (not shown) in accordance with the cycles of the separated vertical sync signal VSync and horizontal sync signal HSync. The image processing section 160 converts the analog image signal from which the sync signals are separated into a digital image signal, for example, by using an A/D conversion circuit (not shown). The image processing section 160 then stores the converted digital image signal as image data (RGB data) on a target image in a DRAM in the storage section 120 on a frame basis. The image processing section 160 may perform, as required, resolution conversion, luminance adjustment, chroma adjustment, and a variety of other types of color tone correction, and keystone correction and other types of image processing on the image data.

The image processing section 160 transmits the produced clock signal PCLK, vertical sync signal VSync, horizontal sync signal HSync, and the image data stored in the DRAM in the storage section 120 via the transmitters 51 and 52. The image data transmitted via the transmitter 51 is also called "image data for the right eye," and the image data transmitted via the transmitter 52 is also called "image data for the left eye." Each of the transmitters 51 and 52 functions as a transceiver for serial transmission between the control section 10 and the image display section 20.

The audio processing section 170 acquires an audio signal contained in the content, amplifies the acquired audio signal, and supplies the amplified audio signal to a loudspeaker (not shown) in the right earphone 32 and a loudspeaker (not shown) in the left earphone 34, which are connected to the connection member 46. For example, when a Dolby (registered trademark) system is employed, relevant processing is performed on the audio signal, and the right earphone 32 and the left earphone 34 output sounds differentiated in terms, for example, of frequency.

The orientation analysis section 169 identifies the orientation of the image display section 20 based on geomagnetism detected with a ten-axis sensor 66, which will be described later. That is, the orientation analysis section 169 identifies the direction of the line of sight of the user who wears the image display section 20. The image evaluation section 168 detects whether or not the captured image contains the same image represented by image data on any of the contents received by the wireless communication section 132 based on a pattern matching or statistic identification method. The image evaluation section 168, when it detects the same image represented by the image data on any of the contents in the captured image, sets the detected image as a display target in relation to the content.

The position identification section 166 transmits the positional information on the position of the image display section 20 produced by the GPS module 137 to the wireless communication section 330 in the server 300 via the wireless communication section 132. The information processor 312 in the server 300 identifies a region corresponding to the current position of the image display section 20 based on the positional information on the position of the image display section 20 received via the wireless communication section 330 and transmits selected contents corresponding to the identified region to the wireless communication section 132 in the HMD 100 via the wireless communication section 330. The position identification section 166 measures the distance between the current position of the image display section 20 and the position related to each of the contents received via the wireless communication section 132. The position identification section 166 and the GPS module 137 correspond to the position identification section and the distance measurement section in the appended claims.

The search determination section 161 determines the type of content that the user desires to search for from the content information stored in the content DB 325 in the server 300 based on operation information accepted by the operation section 135. The search determination section 161 produces search information that identifies the type of content that the user desires to search for and transmits the produced search information to the wireless communication section 330 in the server 300 via the wireless communication section 132. The search determination section 161 corresponds to the control section in the appended claims, and the search information corresponds to the content specifying information in the appended claims.

Based on the selected contents received via the wireless communication section 132, the operation information accepted by the operation section 135, and the display target set by the image evaluation section 168, the image setting section 165 determines a display form including, for example, the display position of each of the selected contents. The image setting section 165 causes the image display section 20 to display an image of the content in the determined display form. The image setting section 165 corresponds to the control section in the appended claims.

The interface 180 connects a variety of external apparatus OA, which are content supply sources, to the control section 10. Examples of the external apparatus OA may include a personal computer (PC), a mobile phone terminal, and a game console. The interface 180 can, for example, be a USB interface, a micro-USE interface, and a memory card interface.

The image display section 20 includes the ten-axis sensor 66, the right display driver 22, the left display driver 24, the right light guide plate 261 as the right optical image display section 26, the left light guide plate 262 as the left optical image display section 28, and the camera 61.

The ten-axis sensor 66 is a sensor that detects acceleration (three axes), angular velocity (three axes), geomagnetism (three axes), and atmospheric pressure (one axis). The ten-axis sensor 66, which is built in the image display section 20 and in the vicinity of the right display driver 22, detects the motion and position of the head of the user who wears the image display section 20 around the head. The ten-axis sensor 66 and the orientation analysis section 169 correspond to the orientation identification section in the appended claims.

The right display driver 22 includes a receiver 53 (Rx 53), the right backlight control section 201 (right BL control section 201) and the right backlight 221 (right BL 221), which function as a light source, the right LCD control section 211 and the right LCD 241, which function as a display device, and the right projection system 251. The right backlight control section 201 and the right backlight 221 function as a light source. The right LCD control section 211 and the right LCD 241 function as a display device. The right backlight control section 201, the right LCD control section 211, the right backlight 221, and the right LCD 241 are also collectively called an "image light generation unit."

The receiver 53 functions as a receiver for serial transmission between the control section 10 and the image display section 20. The right backlight control section 201 drives the right backlight 221 based on an inputted control signal. The right backlight 221 is a light emitter, for example, an LED or an electro-luminescence (EL) device. The right LCD control section 211 drives the right LCD 241 based on the clock signal PCLK, the vertical sync signal VSync, the horizontal sync signal HSync, and the image data for the right eye inputted via the receiver 53. The right LCD 241 is a transmissive liquid crystal panel having a plurality of pixels arranged in a matrix.

The right projection system 251 is formed of a collimator lens that converts the image light outputted from the right LCD 241 into a parallelized light flux. The right light guide plate 261 as the right optical image display section reflects the image light outputted through the right projection system 251 along a predetermined optical path and guides the image light to the user's right eye RE. The right projection system 251 and the right light guide plate 261 are also collectively called a "light guide unit."

The left display driver 24 has the same configuration as that of the right display driver 22. The left display driver 24 includes a receiver 54 (Rx 54), the left backlight control section 202 (left BL control section 202) and the left backlight 222 (left BL 222), which function as a light source, the left LCD control section 212 and the left LCD 242, which function as a display device, and the left projection system 252. The left backlight control section 202 and the left backlight 222 function as a light source. The left LCD control section 212 and the left LCD 242 function as a display device. The left backlight control section 202, the left LCD control section 212, the left backlight 222, and the left LCD 242 are also collectively called an "image light generation unit." The left projection system 252 is formed of a collimator lens that converts the image light outputted from the left LCD 242 into a parallelized light flux. The left light guide plate 262 as the left optical image display section 28 reflects the image light outputted through the left projection system 252 along a predetermined optical path and guides the image light to the user's left eye LE. The left projection system 252 and the left light guide plate 262 are also collectively called a "light guide unit."

Figure 5:
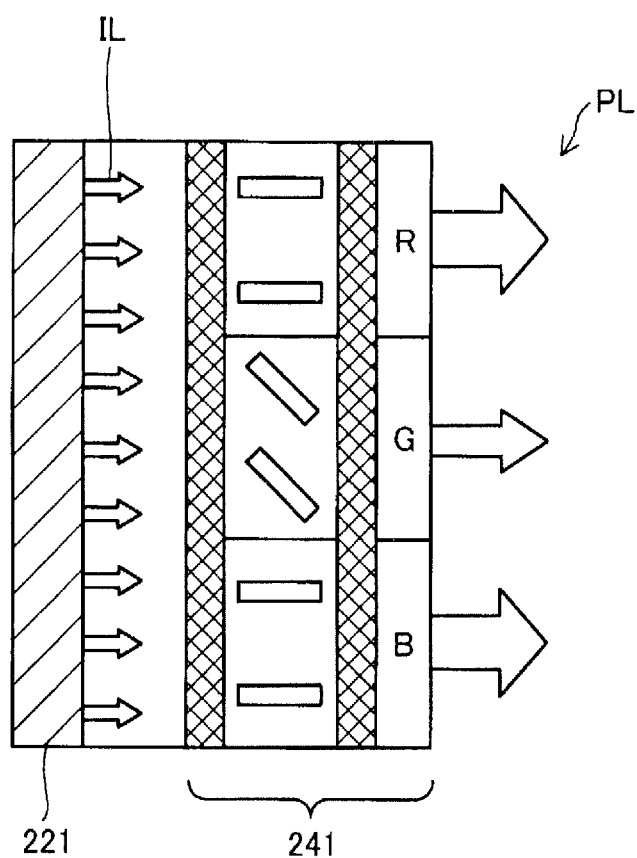
FIG. 5 is a descriptive diagram showing how an image light generation unit outputs image light.

FIG. 5 is a descriptive diagram showing how each of the image light generation units outputs image light. The right LCD 241 drives the liquid crystal material in the position of each of the pixels arranged in a matrix to change the transmittance at which the right LCD 241 transmits light to modulate illumination light IL radiated from the right backlight 221 into effective image light PL representing an image. The same holds true for the left side. The same holds true for the left side. The backlight-based configuration is employed in the present embodiment as shown in FIG. 5, but a front-light-based configuration or a configuration in which image light is outputted based on reflection may be used.

Figure 6:
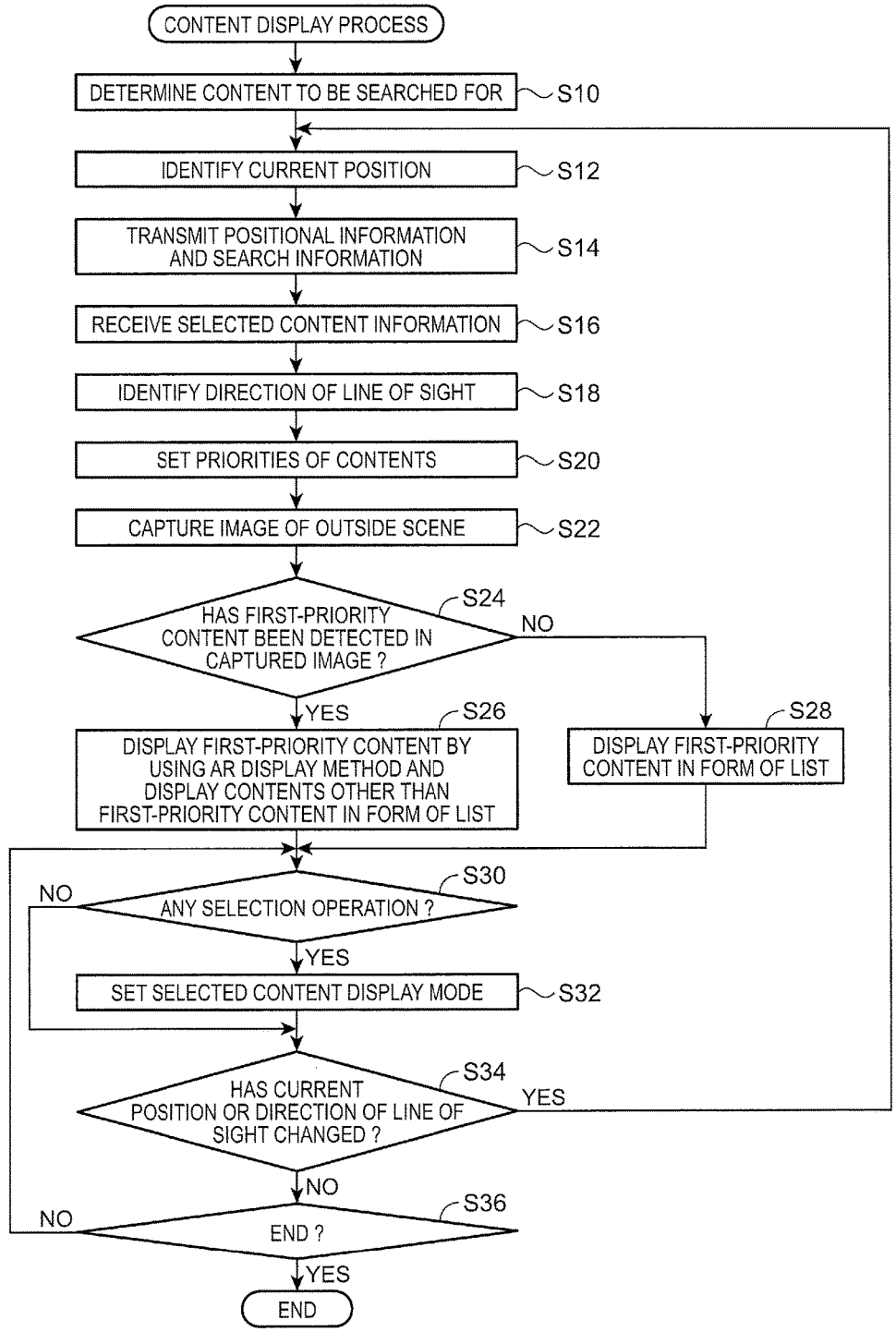
FIG. 6 is a descriptive diagram showing the procedure of a content display process.

A-2. Content Display Process:

FIG. 6 is a descriptive diagram showing the procedure of a content display process. In the content display process, after the control section 10 in the HMD 100 identifies the current position of the image display section 20 and the direction of the line of sight, the server 300 transmits selected contents related to the identified current position and direction of the line of sight to the HMD 100, and the control section 10 in the HMD 100 causes the image display section 20 to display the selected contents.

The search determination section 161 in the control section 10 first determines a content to be searched for from the content information stored in the content DB 325 in the server 300 based on operation accepted by the operation section 135 (step S10) and produces search information representing details of content search. The details of content search include search for a sightseeing spot, such as those shown in FIG. 3.

After a content to be searched for is determined, the GPS module 137 receives signals from GPS satellites, and the position identification section 166 identifies the current position of the image display section 20 (step S12). The wireless communication section 132 then transmits the produced search information and the produced positional information on the position of the image display section 20 to the server 300 (step S14). The information processor 312 in the server 300 acquires, via the wireless communication section 330, the search information and the positional information on the position of the image display section 20 transmitted by the wireless communication section 132. The information processor 312 selects, among the contents stored in the storage section 320, those related to the acquired search information and positional information on the position of the image display section 20 and transmits the selected contents to the HMD 100 via the wireless communication section 330.

The image setting section 165 in the HMD 100 then receives the selected contents transmitted from the wireless communication section 330 via the wireless communication section 132 (step S16). The orientation analysis section 169 then identifies the orientation image display section 20 based on the geomagnetism detected with the ten-axis sensor 66 to identify the direction of the line of sight of the user (step S18). The orientation analysis section 169 sets a user's virtual field of view having a preset range around the identified orientation of the image display section 20 (90° rightward and leftward and 60° upward and downward). In the present embodiment, the description will be made of a case where the content search is search for a sightseeing spot.

Figure 7:
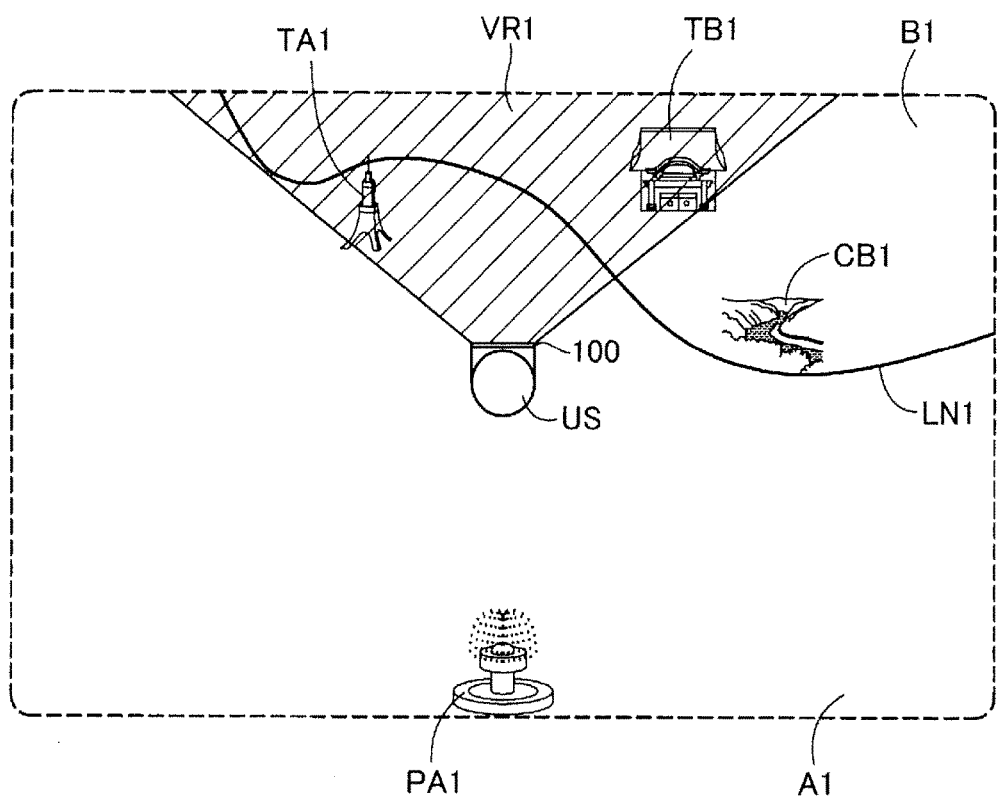

FIG. 7 is a bird's eye view showing the positional relationship between a user US of the HMD 100 and the sightseeing spots having been searched for. In the present embodiment, the server 300 transmits, as selected contents to be transmitted, sightseeing spot contents present within a preset fixed distance from the identified current position of the image display section 20 to the HMD 100. As shown in FIG. 7, contents distributed from the server 300 to the HMD 100 are the following four sightseeing spots: the A1 tower TA1, the public park PA1, the B1 temple TB1, and the B1 gorge CB1. FIG. 7 shows the region A1 and the region B1 separated by a boundary line LN1. The A1 tower TA1 and the public park PA1 are present in the region A1, and the B1 temple TB1 and the B1 gorge CB1 are present in the region B1. The user US of the HMD 100 is currently positioned in the region A1. The hatched region in FIG. 7 is a virtual field of view VR1 of the user US set by the orientation analysis section 169. As shown in FIG. 7, the virtual field of view VR1 contains the A1 tower TA1 and the B1 temple TB1 out of the transmitted four sightseeing spots.

In the content display process, after the direction of the line of sight of the user US is identified (step S18 in FIG. 6), the image setting section 165 sets priorities of the contents contained in the received selected contents based on the identified current position of the image display section 20 and the identified direction of the line of sight (step S20). In the present embodiment, the image setting section 165 sets the priorities of the sightseeing spots (FIG. 7), which are the transmitted contents, based on the relationship among the distance from the user US, the set virtual field of view VR1, and whether or not the contents are present in the same region where the user US is present. Specifically, the image setting section 165 puts a higher priority on a sightseeing spot closer to the user US and also puts a higher priority on a sightseeing spot contained in the virtual field of view VR1. In the example shown in FIG. 7, the image setting section 165 puts the highest priority on the A1 tower TA1, which is closest to the user US, contained in the virtual field of view VR1, and present in the same region A1 where the user US is present. The sightseeing spots of the B1 temple TB1 and the B1 gorge CB1 are separate from the user US by the same distance and present in the region B1, which differs from the region A1, in which the user US is currently positioned. Therefore, among the four sightseeing spots, the image setting section 165 sets the B1 temple TB1, which is contained in the virtual field of view VR1, to be a second-priority sightseeing spot and sets the B1 gorge CB1, which is not contained in the virtual field of view VR1, to be a third-priority sightseeing spot. The public park PA1 is most remote from the user US among the four sightseeing spots and is not contained in the virtual field of view VR1 although the public park PA1 is present in the same region A1 in which the user US is currently positioned. The image setting section 165 therefore sets the public park PA1 to be a fourth-priority sightseeing spot among the four sightseeing spots.

After the priorities of the four sightseeing spots, which are the received contents, are set (step S20), the camera 61 captures an image of an outside scene (step S22). In the present embodiment, the camera 61 is so set that the center line of the viewing angle of the camera 61 coincides with the identified direction of the line of sight of the user US. The image evaluation section 168 then attempts to detect an image of the A1 tower TA1, which is the first-priority content having the highest priority, in the captured image captured with the camera 61, for example, by using pattern matching (step S24).

Figure 8:
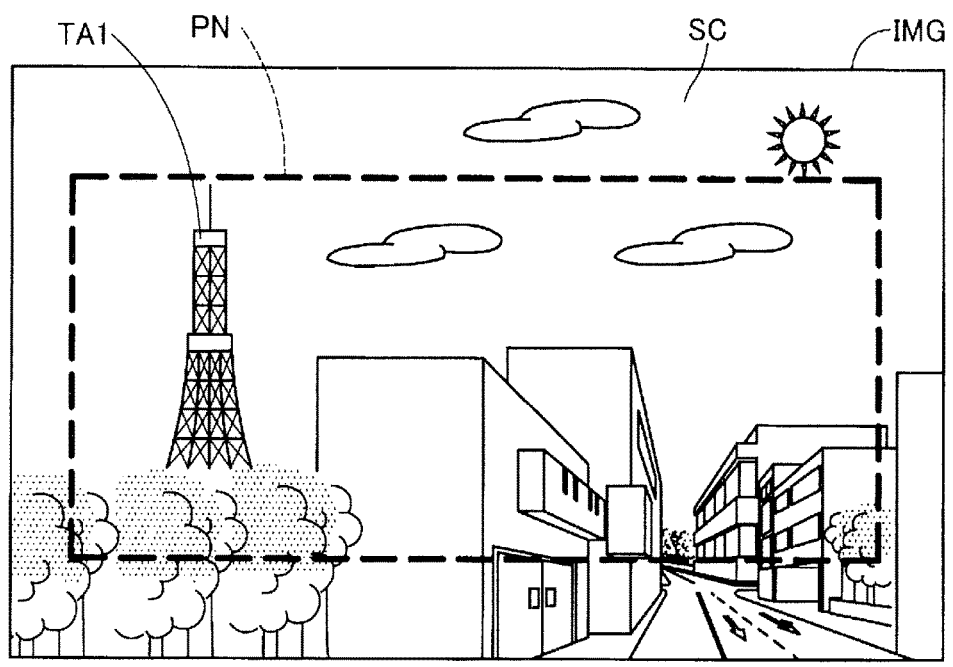
FIG. 8 is a descriptive diagram showing an example of a captured image captured with a camera.

FIG. 8 is a descriptive diagram showing an example of a captured image IMG captured with the camera 61. As shown in FIG. 8, the captured image IMG, which is an image of an outside scene SC, contains the A1 tower TA1. An image display maximum area PN indicated by the broken line represents the outer frame of an area where the image display section 20 can display an image, and the image display maximum area PN is not visible to the user.

In the process in step S24 in FIG. 6, when an image of the A1 tower TA1, which is the first-priority content, is detected in the captured image (step S24: YES), the image setting section 165 uses an image formation unit in the image display section 20 to display the first-priority content in relation to the detected A1 tower TA1 in the image display maximum area PN by using an AR (augmented reality) display method and also display the contents other than the first-priority content among the four sightseeing spots in the form of a list in the image display maximum area PN (step S26).

Figure 9:
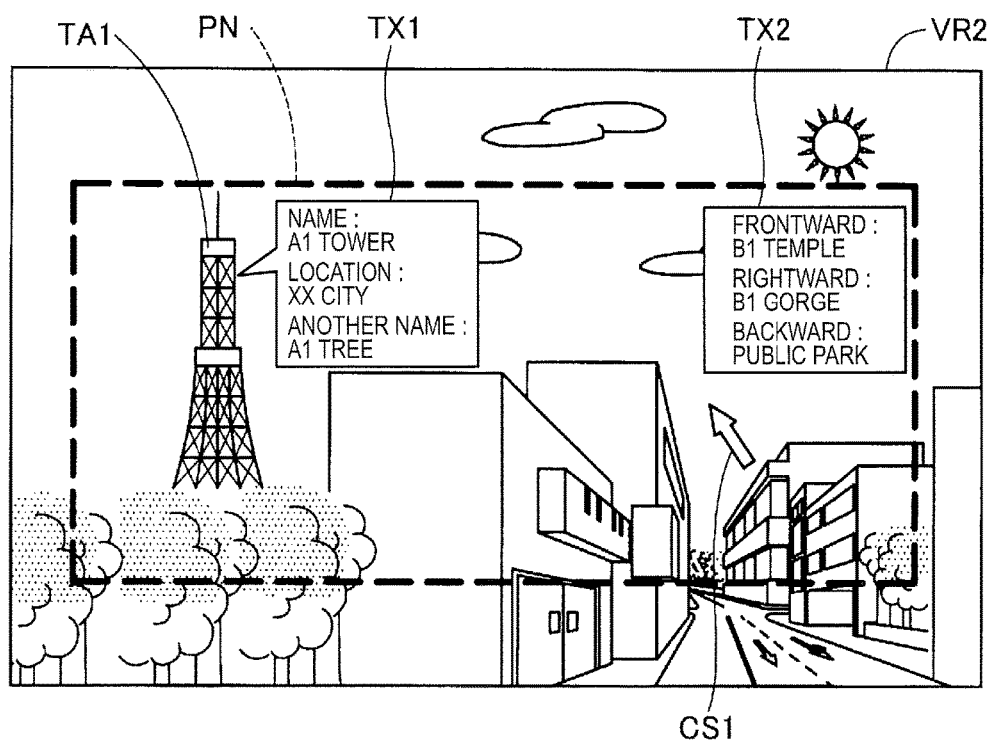
FIG. 9 is a descriptive diagram showing an example of a recognized field of view recognized by the user when a text image and an arrow image are displayed.

FIG. 9 is a descriptive diagram showing an example of a recognized field of view VR2, which is recognized by the user when text images TX1 and TX2 and an arrow image CS1 are displayed. In FIG. 9, the text image TX1 and the other images are displayed in the image display maximum area PN with the text image TX1 and the other images superimposed on the outside scene SC and displayed by using the AR display method. As shown in FIG. 9, the image setting section 165 displays the text image TX1, which shows information on the A1 tower TA1, which is the detected first-priority content, in the image display maximum area PN in relation to the position of the A1 tower TA1 in the captured image IMG. The text image TX1 contains the name of the tower, the location where the A1 tower TA1 is present, and another name of the A1 tower TA1 as the information on the A1 tower TA1. The image setting section 165 further displays the B1 temple TB1, the B1 gorge CB1, and the public park PA1, which are the contents other than the first-priority content, in the descending order of priority as the text image TX2, which is an image in the form of a list. The arrow image CS1 is an image displayed by the image setting section 165, and the position of the arrow image CS1 in the image display maximum area PN is changed through operation performed on the operation section 135.

In the process in step S24 in FIG. 6, when no image of the first-priority content is detected in the captured image (step S24: NO), the image setting section 165 displays, in the present embodiment, the first-priority content in the form of a content listed text image as in the text image TX2 shown in FIG. 9 along with the other contents in the image display maximum area PN (step S28).

After the process in step S26 or the process in step S28 is carried out, the image setting section 165 monitors detection of selection operation of changing the position of the arrow image CS1 displayed in the image display maximum area PN based on operation information and selecting any of the contents displayed in the image display maximum area PN (step S30). When any selection operation is detected (step S30: YES), the image setting section 165 sets the image display maximum area PN in a selected content display mode to display detailed information on the selected content (step S32).

Figure 10:
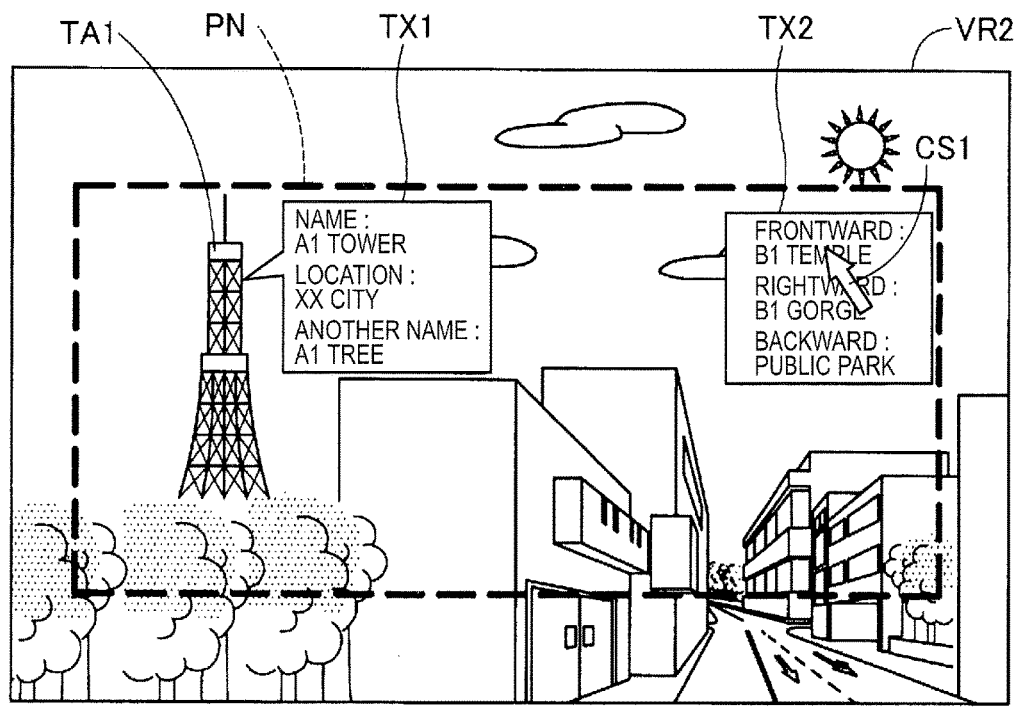
FIG. 10 is a descriptive diagram showing an example of the recognized field of view recognized by the user before a selected content display mode is set.
Figure 11:
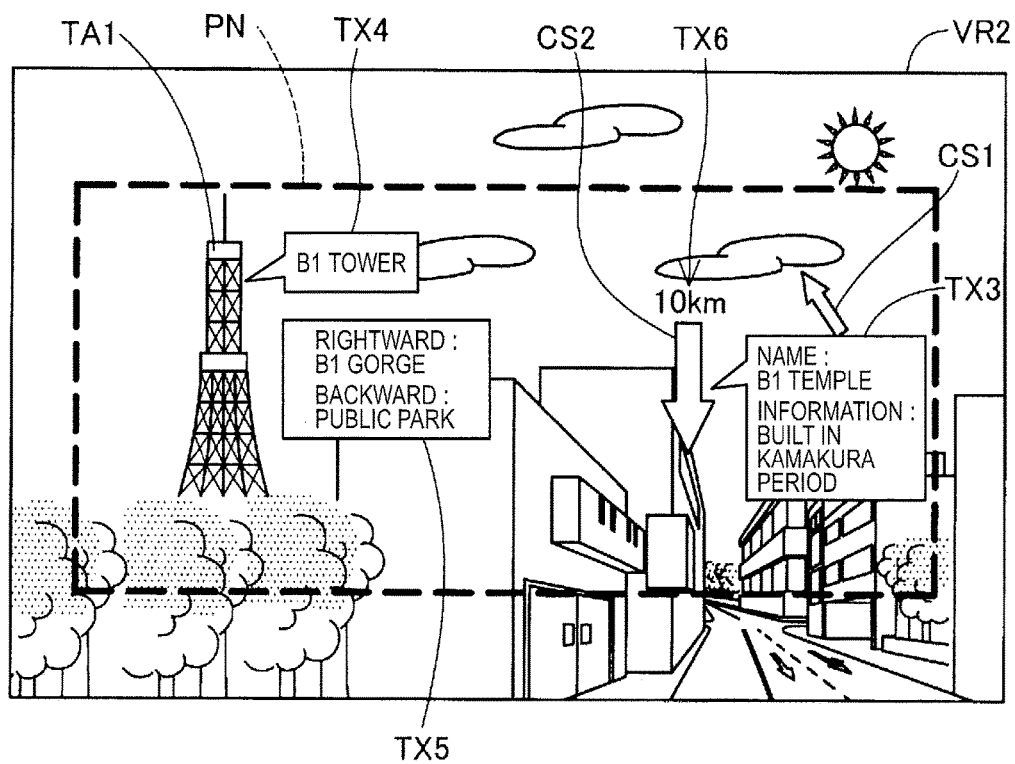
FIG. 11 is a descriptive diagram showing an example of the recognized field of view recognized by the user after the selected content display mode is set.

FIGS. 10 and 11 are descriptive diagrams showing examples of the recognized field of view VR2 recognized by the user before and after the selected content display mode is set. FIG. 10 shows the recognized field of view VR2 immediately before the B1 temple TB1 is selected as a selected content. In the present embodiment, when the operation section 135 accepts predetermined operation, the display position of the arrow image CS1 in the image display maximum area PN is changed. When the operation section 135 accepts finalizing operation with the arrow image CS1 overlapping with the name of a displayed sightseeing spot content, the image setting section 165 displays detailed information on the sightseeing spot with which the arrow image CS1 overlaps in the image display maximum area PN. In the following section, a description will be made of a case where the arrow image CS1 overlaps with the text image of the B1 temple TB1 contained in the text image TX2 and the B1 temple TB1 is selected as a content as shown in FIG. 10.

FIG. 11 shows the recognized field of view VR2 in a case where the B1 temple TB1 contained in the text image TX2 is selected as a selected content. As shown in FIG. 11, when the B1 temple TB1 is selected, the image setting section 165 displays a text image TX3, a text image TX4, a text image TX5, a text image TX6, and an arrow image CS2 instead of the text image TX1 and the text image TX2 in the image display maximum area PN. The text image TX4 is an image displayed by using the AR display method to indicate the position of the first-priority content. The text image TX3 is an image showing detailed information relating to the selected B1 temple TB1. The text image TX3 contains, as the detailed information, the name of the temple and the period when the B1 temple TB1 was built. The text image TX6 is an image showing the distance between the current position of the image display section 20 and the B1 temple TB1 measured by the position identification section 166. The arrow image CS2 is an image showing the position of the B1 temple TB1 identified based on the identified current position of the user US and the identified direction of the line of sight of the user US. The text image TX5 is an image that displays the contents other than the first-priority content and the selected content in the form of a list. In the selected content display mode in the case where the B1 temple TB1 is selected, the directions of the positions where the B1 gorge CB1 and the public park PA1 are present are shown with respect to the orientation of the user US, as shown in the text image TX5.

After the process in step S32 in FIG. 6 is carried out or when no selection operation of selecting a content is detected in the process in step S30 (step S30: NO), the position identification section 166 monitors detection of a change in the current position of the user US, and the orientation analysis section 169 monitors detection of a change in the orientation of the user US (step S34). When at least one of the current position and the orientation of the user US has changed (step S34: YES), the control section 10 carries out the processes in step S12 and the following steps again. In the process in step S34, when the current position or the direction of the line of sight of the user US has not changed (step S34: NO), the operation section 135 monitors acceptance of predetermined operation for terminating the content display process (step S36). When the operation section 135 has not accepted the predetermined operation of terminating the content display process (step S36: NO), the control section 10 keeps carrying out the processes in step S30 and the following steps. In the process in step S36, when the operation section 135 has accepted the predetermined operation of terminating the content display process (step S36: YES), the image setting section 165 stops displaying the images displayed in the image display maximum area PN, and the control section 10 terminates the content display process.

As described above, in the information distribution system 500 according to the present embodiment, the information processor 312 in the server 300 selects a plurality of contents stored in the content DB 325 in the storage section 320 based on the position of the image display section 20 identified by the GPS module 137 and the position identification section 166. The image setting section 165 in the HMD 100 sets one of the selected contents transmitted from the server 300 as a first-priority content and causes the image display section 20 to display the first-priority content in a display form different from the display form in which the contents in the selected contents other than the first-priority content are displayed. To this end, the information distribution system 500 according to the present embodiment sets priorities of images to be displayed by the image display section 20 of the HMD 100 based on the information on the current position and the direction of the line of sight of the user US and in consideration of other types of information and changes the display forms of the contents in accordance with the set priorities. As a result, a content that the user US desires to view can be displayed on the image display section 20 more preferentially and in more detail than the other contents, whereby convenience of the user is improved.

Further, in the information distribution system 500 according to the present embodiment, the image display section 20 of the HMD 100 is mounted on the head of the user US and transmits an outside scene, and the ten-axis sensor 66 and the orientation analysis section 169 identify the orientation of the image display section 20 to identify the direction of the line of sight of the user US. Based on the current position of the image display section 20, the direction of the line of sight of the user US, and the selected contents transmitted from the server 300, the image setting section 165 displays a first-priority content among the selected contents in detail in the form of the text image TX1 and displays the contents other than the first-priority content in the form of a list, for example, in the form of the second text image TX2. The thus configured information distribution system 500 according to the present embodiment displays a content that the user conceivably desires to view in detail and displays the other contents with a minimum amount of information. The user can therefore view detailed information on the first-priority content while viewing the transmitted outside scene SC over a wide range, whereby the convenience of the user is further improved.

Further, in the information distribution system 500 according to the present embodiment, the camera 61 captures an image of the outside scene SC, and the image setting section 165 causes the image display section 20 to display an image of a first-priority content by using the AR display method in relation to the position of a display target detected in the captured image IMG captured with the camera 61. The thus configured information distribution system 500 according to the present embodiment allows the user to visually recognize which content in the captured image is displayed in the form of information on the displayed image and hence readily recognize the correspondence relationship between the image of the content and the display target contained in the outside scene SC, whereby the convenience of the user is further improved.

Further, in the information distribution system 500 according to the present embodiment, based on the current position of the image display section 20 measured by the position identification section 166 and the position related to the B1 temple TB1, which is a content, the image setting section 165 causes the image display section 20 to display the text image TX6 showing the distance between the current position of the user US and the B1 temple TB1. In the thus configured information distribution system 500 according to the present embodiment, in a case where a content in question is, for example, a sightseeing spot related to a specific position, the user can recognize the distance to the position related to the content even when the user cannot view the content as the outside scene SC, whereby the convenience of the user is further improved.

Further, in the information distribution system 500 according to the present embodiment, the search determination section 161 determines the type of content that the user desires to search for based on operation information accepted by the operation section 135, and the information processor 312 in the server 300 selects contents stored in the content DB 325 in the storage section 320 based on produced search information. In the thus configured information distribution system 500 according to the present embodiment, among the contents in the content information stored in the content DB 325, selected contents within a range narrowed based on the search information are transmitted to the HMD 100 and images of contents that the user US possibly desires to view can be more appropriately displayed on the image display section 20, whereby the convenience of the user is further improved.

B. Variations

The invention is not limited to the embodiment described above and can be implemented in a variety of other aspects to the extent that they do not depart from the substance of the invention. For example, the following variations are also conceivable.

B1. Variation 1:

In the embodiment described above, the image setting section 165 sets priorities of contents contained in selected contents based on an identified current position of the image display section 20 and an identified direction of the line of sight of the user US. The server 300 may instead select selected contents based on the direction of the line of sight. For example, the information processor 312 in the server 300, before transmitting selected contents to the HMD 100, receives orientation information representing the direction of the line of sight of the user US transmitted from the HMD 100 and selects selected contents based on the received direction of the line of sight and the current position of the image display section 20. In the variation, the user can view detailed information on a first-priority content while viewing the transmitted outside scene SC over a wide range, and the processing burden on control section 10 in the HMD 100 can be reduced.

Further, in the embodiment described above, the image setting section 165 sets the priorities of contents based on an identified direction of the line of sight of the user US. The priorities of contents may instead be set based on a log of changes in identified direction of the line of sight of the user US. For example, the image setting section 165 may store changes in the direction of the line of sight of the user US and set the virtual field of view VR1 based on a log of the stored changes in the direction of the line of sight. The virtual field of view VR1 is a preset range around the orientation of the image display section 20 in the embodiment described above. In the variation, on the other hand, the virtual field of view VR1 may be set, based on the log of the changes in the direction of the line of sight, as a range over which the orientation of the image display section 20 is changed. In the variation, since the image setting section 165 sets the display form of an image displayed by the image display section 20 based on the direction of the line of sight of the user US and in consideration of the log of the stored changes in the direction of the line of sight, a content that the user US desires to view can be more appropriately provided.

The log of changes in the direction of the line of sight may instead be set based on the type of an image of a specific target object or an image of a specific character contained in a captured image. The image setting section 165 may set the display form of an image of a first-priority content and the display form of images of other contents based on the thus set log of changes.

The above embodiment has been described with reference to the case where the display form of a content that the image setting section 165 causes the image display section to display is the display position where an image is displayed by way of example, but the display form is not necessarily the display position. For example, the image setting section 165 may set the transparency of the outside scene SC differently between a first-priority content and other contents. Further, when a first-priority content and other contents are text images, the image setting section 165 may set the font of text, as the display forms of the images, differently between the first-priority content and the other contents.

In the embodiment described above, the image setting section 165 sets the display form of an image related to a first-priority content in such a way that the image is superimposed on the outside scene SC by using the AR display method but may instead set the display form of contents other than the first-priority content. For example, the image setting section 165 may instead display contents other than the first-priority content by using the AR display method. Still instead, an image related to a first-priority content may be displayed in a central portion of the image display maximum area PN, and images related to contents other than the first-priority content may be displayed in portions other than the central portion of the image display maximum area PN.

In the embodiment described above, the image setting section 165 displays images in the image display maximum area PN in such a way that the display form of an image of a first-priority content and the display form of all images of other contents differ from each other, but the display forms are not necessarily set as described above and a variety of variations are conceivable. For example, the image setting section 165 may display an image of a first-priority content in the image display maximum area PN and part of images of other contents in the image display maximum area PN. Instead, the image setting section 165 may also set priorities of contents other than a first-priority content and display images related to the contents in the image display maximum area PN in different display forms, for example, among the first-priority content, a second-priority content, and a third-priority content in accordance with the priorities.

In the embodiment described above, when an image related to a first-priority content is contained in a captured image, the image setting section 165 displays images in the image display maximum area PN in such a way that the display form of the image of the first-priority content differs from the display form of images related to other contents, but the display form of the first-priority content is not necessarily set under the condition described above and may instead be set in a variety of other conditions. For example, irrespective of whether or not an image of a first-priority content is contained in a captured image, the image setting section 165 may display images in such a way that the display form of the first-priority content always differs from the display form of images of other contents based on set priorities of the contents (step S20 in FIG. 6, for example).

In the embodiment described above, a first-priority content is set based on a captured image captured with the camera 61, but an image used when a first-priority content is set is not necessarily an image captured with the camera 61. For example, when a first-priority content is set, an image captured with an apparatus different from the server 300 and the HMD 100 may be used, or an image based on image data captured in the past may be used.

B2. Variation 2:

In the embodiment described above, the information distribution system 500 including the HMD 100 and the server 300 has been described. Instead, the control performed by the server 300 in the embodiment described above may be performed by an HMD100a according to a variation. In the variation, a storage section 120a in the HMD 100a has the content DB 325 provided in the storage section 320 in the embodiment described above. An image setting section 165a in the HMD 100a selects a plurality of contents from content information stored in the storage section 120a based on an identified current position of an image display section 20a and an identified orientation of the image display section 20a. In the HMD 100a according to the variation, since a content that the user US desires to view can be displayed on the image display section 20a more preferentially and more in detail than other contents, the convenience of the user is improved.

The storage section 120a in the HMD 100a according to the variation can update the content information stored in the content DB 325 via the interface 180. Further, the HMD 100a may not include the wireless communication section 132.

In the embodiment described above, a content is formed of image data on a building or any other object and image data formed of a character image or any other image of information stored in the storage section in relation to the building, but a content is not limited the image data described above and can be changed in a variety of manners. For example, a content may be data formed of motion images or any other data or data that identifies voice. In the present specification, a content is defined as a kind of medium, such as an image showing information.

In the embodiment described above, to identify the position of the image display section 20, the GPS module 137 is used, but the position of the image display section 20 can be identified in a variety of other ways. For example, the position of the image display section 20 may be identified by using a method for causing a receiver or any other component formed in the image display section 20 to receive radio waves emitted from an object relating to a content, radio waves emitted from a beacon, or radio waves emitted from any other object to identify the distance to a source of the radio waves or the positional relationship between the source and the image display section 20. Further, an IC tag may be so read that the distance between the image display section 20 and the read IC tag or the positional relationship therebetween is identified. Conversely, the image display section 20 may be provided with a beacon or any other component that emits radio waves, and an object that is not the image display section 20 and is located in a known position may receive the radio waves emitted from the beacon. The server 300 or any other apparatus may then evaluate the received radio waves to identify the position of the image display section 20.

B3. Variation 3:

In the embodiment described above, the operation section 135 is formed in the control section 10, but the form of the operation section 135 can be changed in a variety of manners. For example, the operation section 135 may be a user interface that is a component separate from the control section 10. In this case, since the operation section 135 is a component separate from the control section 10, in which the power source 130 and other components are formed, the size of the operation section 135 can be reduced, whereby the user can operate the operation section 135 in an improved manner. Further, when a ten-axis sensor that detects motion of the operation section is also formed in the operation section 135, and a variety of types of operation are performed based on the detected motion, the user can intuitively operate the HMD 100.

For example, each of the image light generation units may include an organic EL (organic electro-luminescence) display and an organic EL control section. Instead, for example, each of the image light generation units may use an LCOS (liquid crystal on silicon) device (LCos is a registered trademark), a digital micromirror device, or any other device in place of the LCD. Still instead, for example, the invention is also applicable to a laser-retina-projection-type head mounted display. In a laser-retina-projection-type head mounted display, the image display maximum area PN can be defined as an image area recognized by the user's eye.

Further, for example, the HMD100 may employ an aspect in which the optical image display sections cover only part of the user's eyes, in other words, a head mounted display having an aspect in which the optical image display sections do not completely cover the user's eyes. Moreover, the HMD 100 may be what is called a monocular head mounted display.

Figure 12A:
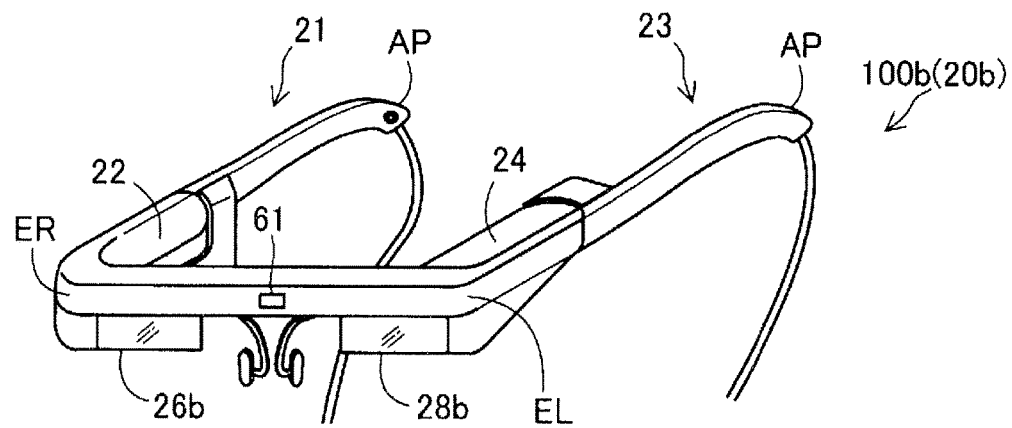
FIGS. 12A and 12B are descriptive diagrams each showing an exterior configuration of an HMD in a variation.
Figure 12B:
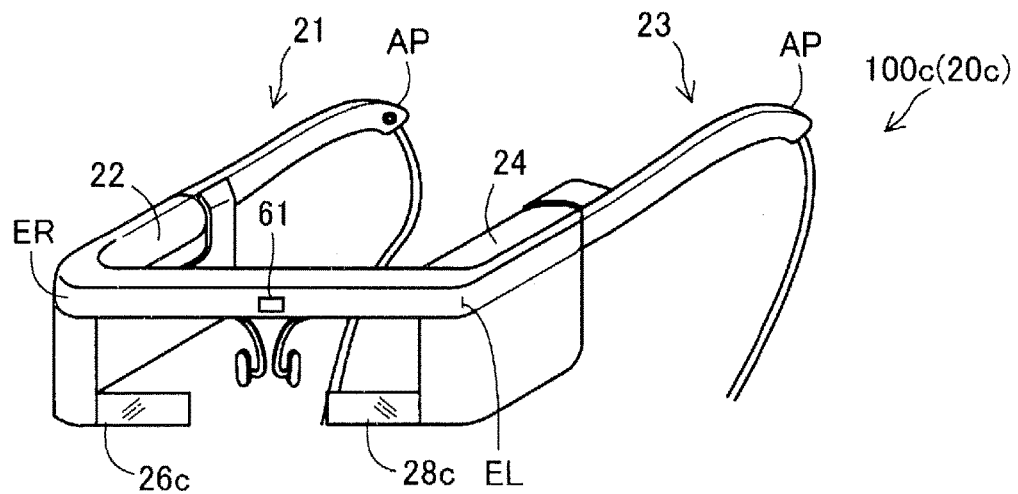

FIGS. 12A and 12B are descriptive diagrams each showing an exterior configuration of the HMD 100 in a variation. An HMD 100b shown in FIG. 12A differs from the HMD 100 shown in FIG. 1 in that an image display section 20b includes a right optical image display section 26b in place of the right optical image display section 26 and a left optical image display section 28b in place of the left optical image display section 28. The right optical image display section 26b is formed to be smaller than the corresponding optical member in the embodiment described above and disposed in a position obliquely upward with respect to the right eye of the user who wears the HMD 100b. Similarly, the left optical image display section 28b is formed to be smaller than the corresponding optical member in the embodiment described above and disposed in a position obliquely upward with respect to the left eye of the user who wears the HMD 100b. An HMD 100c shown in FIG. 12B differs from the HMD 100 shown in FIG. 1 in that an image display section 20c includes a right optical image display section 26c in place of the right optical image display section 26 and a left optical image display section 28c in place of the left optical image display section 28. The right optical image display section 26c is formed to be smaller than the corresponding optical member in the embodiment described above and disposed in a position obliquely downward with respect to the right eye of the user who wears the head mounted display. The left optical image display section 28c is formed to be smaller than the corresponding optical member in the embodiment described above and disposed in a position obliquely downward with respect to the left eye of the user who wears the head mounted display. As described above, the optical image display sections only need to be disposed in positions in the vicinity of the user's eyes. Further, the optical member that forms each of the optical image display sections can be arbitrarily sized, and the HMD 100 can employ an aspect in which the optical image display sections cover only part of the user's eyes, in other words, an aspect in which the optical image display sections do not completely cover the user's eyes.

Further, each of the earphones may be an ear-hooked type or a headband type or may even be omitted. Moreover, for example, the head mounted display may be configured to be incorporated in an automobile, an airplane, and other vehicles. Further, for example, the head mounted display may be configured to be built in a helmet or other body protection gears.

The configuration of the HMD 100 in the embodiment described above is presented only by way of example and can be changed in a variety of manners. For example, one of the direction key 16 and the track pad 14 provided on the control section 10 may be omitted, or in addition to or in place of the direction key 16 and the track pad 14, an operation stick or any other operation interface may be provided. Further, the control section 10 may have a configuration to which a keyboard, a mouse, or any other input device can be connected and may accept an input from the keyboard or the mouse.

As the image display section, the image display section 20 worn as glasses may be replaced with an image display section worn, for example, as a cap or any other image display section worn based on another method. Further, instead of the HMD 100, a handheld display may be employed, like binoculars, as an image display apparatus that allows a user to view a displayed image by allowing the user to hold the handheld display in front of the user's eyes, for example, by hand unlike a head mounted display and look into the handheld display. Further, the earphones 32 and 34 can be omitted as appropriate.

In the embodiment described above, the HMD 100 may guide image light fluxes representing the same image to the user's right and left eyes to allow the user to view a two-dimensional image or may guide image light fluxes representing images different from each other to the user's right and left eyes to allow the user to view a three-dimensional image.

In the embodiment described above, part of the configuration achieved by hardware may be replaced with software. Conversely, part of the configuration achieved by software may be replaced with hardware. For example, in the embodiment described above, the image processing section 160 and the audio processing section 170 are achieved by the CPU 140 that reads and executes computer programs, and these functional portions may instead be achieved in the form of hardware circuits.

When part or entirety of the functions of the invention is achieved by software, the software (computer program) can be provided in the form of a computer readable recording medium on which the software is stored. In the invention, the "computer readable recording medium" is not limited to a flexible disk, a CD-ROM, or any other portable recording medium and may include a variety of RAMS, ROMs, and other internal storage devices in a computer and a hard disk drive and other external storage devices fixed to a computer.

In the embodiment described above, the control section 10 and the image display section 20 are components separate from each other as shown in FIGS. 1 and 4, but the control section 10 and the image display section 20 are not necessarily configured as described above and can be changed in a variety of manners. For example, entirety or part of the components formed in the control section 10 may be formed in the image display section 20. Further, the power source 130 in the embodiment described above may be formed as an exchangeable independent component, and the components formed in the control section 10 may be redundantly formed in the image display section 20. For example, the CPU 140 shown in FIG. 4 may be formed in both the control section 10 and the image display section 20, and the CPU 140 formed in the control section 10 and a CPU formed in the image display section 20 may function differently.

Further, the control section 10 and the image display section 20 may be integrated with each other to form a wearable computer that can be attached to user's clothing.

The invention is not limited to the embodiment or the variations described above and can be implemented in a variety of other configurations to the extent that they do not depart from the substance of the invention. For example, technical features in the embodiment and the variations that correspond to the technical features in the aspects described in the section of Summary can be exchanged or combined with each other as appropriate in order to achieve part or entirety of the advantageous effects described above. Further, if any of the technical features is not described as an essential part in the present specification, the technical feature can be omitted as appropriate.

The entire disclosure of Japanese Patent Application No. 2014-123057, filed Jun. 16, 2014 is expressly incorporated by reference herein.

What is claimed is:
1. An information distribution system comprising:
an image display apparatus including: a camera configured to capture an image of an outside scene; an image display section that displays an image on an image display area based on a content; a position identification section that identifies the position of the image display apparatus; a first communication section; and a control section; and
an information processing apparatus including: a storage section that stores content information on a content related to a position; a second communication section; and a selection section,
wherein the first communication section transmits information on the identified position of the image display apparatus to the second communication section,
the second communication section receives the transmitted information on the position of the image display apparatus,
the selection section selects at least two contents from a plurality of contents stored in the storage section based on the received position of the image display apparatus,
the second communication section distributes content information on the selected at least two contents to the first communication section,
the first communication section receives the distributed content information, and
the control section sets one content in the received content information as a first content and causes the image display section to display the set first content and the contents other than the first content in the distributed content information in different display forms,
the control section sets priorities of the plurality of contents based on a current position of the image display apparatus and a field of view of a user of the image display apparatus, such that:
(i) a first priority is set for first content in a first region where the image display apparatus is present, the first content being in the field of view of the user;
(ii) a second priority is set for second content in a second region where the image display apparatus is not present, the second content being in the field of view of the user;
(iii) a third priority is set for third content in the second region, the third content being outside the field of view of the user; and
(iv) a fourth priority is set for fourth content in the first region, the fourth content being outside the field of view of the user, the priorities being ordered from highest to lowest in order from the first priority to the fourth priority,
after the priorities of the contents are set, the camera captures the image of the outside scene, and the captured image is compared to the contents stored in the storage section,
when a highest priority content is detected in the captured image, the control section causes the image display section to display the highest priority content differently from the contents other than the highest priority content by displaying the highest priority content as an augmented reality image and displaying the contents other than the highest priority content as a list,
when the highest priority content is not detected in the captured image, the control section causes the image display section to display the highest priority content as a list, and
functions performed by the image display section, the position identification section, the first communication display section, the control section, the storage section, the second communication section and the selection section are achieved under control of a central processing unit (CPU).
2. The information distribution system according to claim 1,
wherein the image display section displays a virtual image as the image displayed based on a content and transmits the outside scene.
3. The information distribution system according to claim 2,
wherein the image display apparatus further includes an orientation identification section that identifies the orientation of the image display section,
the control section sets, based on the identified position of the image display apparatus, the distributed content information, and the identified orientation of the image display section, a display form of a first virtual image that is a virtual image displayed based on the first content and a display form of a second virtual image that is a virtual image displayed based on the contents other than the first content, and functions performed by the orientation identification section are achieved under control of the CPU.

4. The information distribution system according to claim 3,
wherein the control section stores a change in the identified orientation of the image display section and sets at least one of the display form of the first virtual image and the display form of the second virtual image based on the identified position of the image display apparatus, the distributed content information, and the stored change in the orientation of the image display section.

5. The information distribution system according to claim 3,
wherein the image display apparatus further includes a distance measurement section that measures the distance between a position related to a content in the distributed content information and the position of the image display apparatus,
the control section sets at least one of the display form of the first virtual image and the display form of the second virtual image based on a measured distance to at least one content, the identified position of the image display apparatus, and the distributed content information, and
functions performed by the distance measurement section are achieved under control of the CPU.

6. The information distribution system according to claim 3,
wherein the image display apparatus further includes an operation section that accepts operation,
the control section produces content specifying information that specifies a content in the distributed content information based on the accepted operation,
the first communication section transmits the produced content specifying information to the second communication section,
the second communication section receives the transmitted content specifying information,
the selection section selects at least two contents from the content information stored in the storage section based on the received content specifying information and the identified position of the image display apparatus, and
functions performed by the operation section are achieved under control of the CPU.

7. The information distribution system according to claim 3,
wherein at least one of the display form of the first virtual image and the display form of the second virtual image is the position where a virtual image is displayed on the image display section.

8. The information distribution system according to claim 1,
wherein the control section sets, based on the identified position of the image display apparatus, the distributed content information, and a captured outside scene, at least one of a display form of a first virtual image that is a virtual image displayed based on the first content and a display form of a second virtual image that is a virtual image displayed based on the contents other than the first content.

9. The information distribution system according to claim 1,
wherein the control section detects an image related to the first content in the captured outside scene and, as the display form of the first virtual image, sets the position where the first virtual image is displayed on the image display section to be a position related to the detected image.

10. The information distribution system according to claim 1,
wherein the image display section displays a virtual image as the image displayed based on a content and transmits the outside scene,
the image display apparatus further includes an orientation identification section that identifies the orientation of the image display section,
the first communication section transmits orientation information representing the identified orientation to the second communication section,
the second communication section receives the transmitted orientation information,
the selection section selects the at least two contents based on the identified position of the image display apparatus and the transmitted orientation information, and
functions performed by the orientation identification section are achieved under control of the CPU.

11. The information distribution system according to claim 1, wherein
the control section monitors detection of a selection operation, the selection operation including causing a selection image to move from one display position to another display position on the image display area, so that the selection image overlaps selected content in the image display area, and
when the selection operation is detected, the control section sets the image display area to a selected content display mode to display detailed information from the list on the selected content in the image display area.

12. A transmissive head mounted display comprising:
a camera configured to capture an image of an outside scene;
a storage section that stores contents;
a position identification section that identifies the position of the head mounted display;
a first receiver that receives distributed content information in relation to the identified position;
an image display section that displays virtual images on an image display area based on at least two contents in the received content information and transmits the outside scene; and
a control section that sets one content in the received content information as a first content and causes the image display section to display the set first content and the contents other than the first content in the distributed content information in different display forms,
wherein the control section sets priorities of the plurality of contents based on a current position of the head mounted display and a field of view of a user of the head mounted display, such that:
(i) a first priority is set for first content in a first region where the head mounted display is present, the first content being in the field of view of the user;
(ii) a second priority is set for second content in a second region where the head mounted display is not present, the second content being in the field of view of the user;
(iii) a third priority is set for third content in the second region, the third content being outside the field of view of the user; and (iv) a fourth priority is set for fourth content in the first region, the fourth content being outside the field of view of the user, the priorities being ordered from highest to lowest in order from the first priority to the fourth priority, after the priorities of the contents are set, the camera captures the image of the outside scene, and the captured image is compared to the contents stored in the storage section, when a highest priority content is detected in the captured image, the control section causes the image display section to display the highest priority content differently from the contents other than the highest priority content by displaying the highest priority content as an augmented reality image and displaying the contents other than the highest priority content as a list, when the highest priority content is not detected in the captured image, the control section causes the image display section to display the highest priority content as a list, and the control section monitors detection of a selection operation, the selection operation functions performed by the position identification section, the image display section and the control section are achieved under control of a central processing unit (CPU).

13. A transmissive head mounted display comprising:
a camera configured to capture an image of an outside scene;
a position identification section that identifies the position of the head mounted display;
a storage section that stores contents;
a selection section that selects at least two contents based on the identified position;
an image display section that displays virtual images on an image display area based on the selected at least two contents and transmits the outside scene; and
a control section that sets one of the selected at least two contents as a first content and causes the image display section to display the set first content and the contents other than the first content in the stored content information in different display forms,
wherein the control section sets priorities of the plurality of contents based on a current position of the head mounted display and a field of view of a user of the head mounted display, such that:
(i) a first priority is set for first content in a first region where the head mounted display is present, the first content being in the field of view of the user;
(ii) a second priority is set for second content in a second region where the head mounted display is not present, the second content being in the field of view of the user;
(iii) a third priority is set for third content in the second region, the third content being outside the field of view of the user; and
(iv) a fourth priority is set for fourth content in the first region, the fourth content being outside the field of view of the user, the priorities being ordered from highest to lowest in order from the first priority to the fourth priority,
after the priorities of the contents are set, the camera captures the image of the outside scene, and the captured image is compared to the contents stored in the storage section,
when a highest priority content is detected in the captured image, the control section causes the image display section to display the highest priority content differently from the contents other than the highest priority content by displaying the highest priority content as an augmented reality image and displaying the contents other than the highest priority content as a list,
when the highest priority content is not detected in the captured image, the control section causes the image display section to display the highest priority content as a list, and
functions performed by the position identification section, the storage section, the selection section, the image display section and the control section are achieved under control of a central processing unit (CPU).

14. A method for controlling a transmissive head mounted display, the head mounted display including a first receiver that receives distributed content information, and an image display that displays virtual images on an image display area based on at least two contents in the distributed content information and transmits the outside scene, the method comprising:
capturing an image of an outside scene;
storing contents in a storage;
identifying the position of the head mounted display;
receiving content information related to the identified position;
setting one content in the received content information as a first content and causing the image display to display the set first content and the contents other than the first content in the received content information in different display forms;
setting priorities of the plurality of contents based on a current position of the head mounted display and a field of view of a user of the head mounted display, such that:
(i) a first priority is set for first content in a first region where the head mounted display is present, the first content being in the field of view of the user;
(ii) a second priority is set for second content in a second region where the head mounted display is not present, the second content being in the field of view of the user;
(iii) a third priority is set for third content in the second region, the third content being outside the field of view of the user; and
(iv) a fourth priority is set for fourth content in the first region, the fourth content being outside the field of view of the user, the priorities being ordered from highest to lowest in order from the first priority to the fourth priority,
after the priorities of the contents are set, capturing the image of the outside scene, and comparing the captured image to the contents stored in the storage;
when a highest priority content is detected in the captured image, displaying the highest priority content differently from the contents other than the highest priority content by displaying the highest priority content as an augmented reality image and displaying the contents other than the highest priority content as a list; and
when the highest priority content is not detected in the captured image, displaying the highest priority content as a list.

15. A computer program product for a transmissive head mounted display, the head mounted display including a camera configured to capture an image of an outside scene and an image display that displays an image on an image display area based on a content, the computer program product comprising a non-transitory computer-readable medium having a computer program embodied therein, the computer program being adapted to be executed on a processor to implement a method, the method comprising:
identifying the position of the head mounted display;
storing contents in a storage;
selecting at least two contents based on the identified position;
displaying virtual images based on the selected at least two contents and transmitting the outside scene;
setting one of the selected at least two contents as a first content and causing the image display to display the set first content and the contents other than the first content in the stored content information in different display forms;
setting priorities of the plurality of contents based on a current position of the head mounted display and a field of view of a user of the head mounted display, such that:
(i) a first priority is set for first content in a first region where the head mounted display is present, the first content being in the field of view of the user;
(ii) a second priority is set for second content in a second region where the head mounted display is not present, the second content being in the field of view of the user;
(iii) a third priority is set for third content in the second region, the third content being outside the field of view of the user; and
(iv) a fourth priority is set for fourth content in the first region, the fourth content being outside the field of view of the user, the priorities being ordered from highest to lowest in order from the first priority to the fourth priority,
after the priorities of the contents are set, capturing the image of the outside scene, and comparing the captured image to the contents stored in the storage;
when a highest priority content is detected in the captured image, displaying the highest priority content differently from the contents other than the highest priority content by displaying the highest priority content as an augmented reality image and displaying the contents other than the highest priority content as a list; and
when the highest priority content is not detected in the captured image, displaying the highest priority content as a list.

* * * * *